United States Patent
Padroni

(10) Patent No.: US 8,256,392 B2
(45) Date of Patent: Sep. 4, 2012

(54) METHOD FOR ACTUATING AN ELECTROMAGNETIC SWITCHING VALVE

(75) Inventor: Gianni Padroni, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 326 days.

(21) Appl. No.: 12/668,504

(22) PCT Filed: Jun. 18, 2008

(86) PCT No.: PCT/EP2008/057668
§ 371 (c)(1),
(2), (4) Date: Jan. 11, 2010

(87) PCT Pub. No.: WO2009/007207
PCT Pub. Date: Jan. 15, 2009

(65) Prior Publication Data
US 2010/0192881 A1      Aug. 5, 2010

Related U.S. Application Data

(60) Provisional application No. 60/948,776, filed on Jul. 10, 2007.

(51) Int. Cl.
*F01L 9/02* (2006.01)
(52) U.S. Cl. ............. 123/90.12; 123/90.11; 123/90.16
(58) Field of Classification Search ........... 123/90.11, 123/90.12, 90.16; 251/129.15, 129.16
See application file for complete search history.

(56) References Cited

U.S. PATENT DOCUMENTS

2005/0229878 A1 * 10/2005 Taylor et al. ............... 123/90.11

FOREIGN PATENT DOCUMENTS

| DE | 19921456 | 11/2000 |
|---|---|---|
| DE | 102005061509 | 11/2006 |
| DE | 102006055171 | 6/2007 |
| WO | 9706355 | 2/1997 |
| WO | 2004113687 | 12/2004 |

OTHER PUBLICATIONS

Abstract for DE 199 21 456 A1; Nov. 2000.*

* cited by examiner

*Primary Examiner* — Zelalem Eshete
(74) *Attorney, Agent, or Firm* — Volpe and Koenig, P.C.

(57) ABSTRACT

A method for actuating an electromagnetic switching valve (2) which is part of a fluid system s which has different operating states and which has a solenoid (17) and an armature group (19) which can be moved between a first switched position, which enables a flow of fluid, and a second switched position which blocks the flow of fluid, and has a valve-closing body (22) and a magnet armature (20) which is connected to the valve-closing body (22) in a tensile force-free frictional connection. In this context, in at least one operating state of the fluid system, intermediate excitation (30) in order to damp overshooting of the magnet armature (20) is performed between two coil excitations which move the armature group (19).

10 Claims, 4 Drawing Sheets

//\# METHOD FOR ACTUATING AN ELECTROMAGNETIC SWITCHING VALVE

BACKGROUND

The invention relates to a method for actuating an electromagnetic switching valve that is part of a fluid system having different operating states and that has a solenoid as well as an armature group that can be moved between a first switch position enabling a flow of fluid and a second switch position blocking the flow of fluid, with this armature group having a valve-closing body and a magnet armature connecting to the valve-closing body with a tensile force-free frictional connection.

Electromagnetic switching valves with an armature group in which the magnet armature connects to the valve-closing body with a tensile force-free frictional connection are known in fluid technology in a large variety both with respect to their application and also with respect to their structural configuration. One such switching valve emerges, for example, from DE 10 2005 061 509 A1. The armature group in that document comprises a magnet armature, an armature tappet mounted on the magnet armature, and a valve-closing body that is not connected rigidly to the armature tappet, but instead merely contacts the armature tappet on an end face. When the valve-closing body is displaced into the first switch position enabling the flow of fluid, the valve-closing body contacts the end face of a valve-housing-fixed bearing bushing for the armature tappet, while, due to mass-inertial forces, the armature tappet separates from the valve-closing body and is displaced further together with the magnet armature. The duration and the profile of this overshoot also designated as the free-flight phase below are dependent on the friction forces and the force of an armature spring returning the armature tappet so that it contacts the valve-closing body.

The free-flight phase, however, could have a considerable negative effect on a functional operation of the switching valve with high-frequency switching processes, i.e., processes set apart by only extremely short pauses, if the duration of the free-flight phase were to be significantly longer than the largest possible permissible pause between successive coil excitations, wherein this pause is dependent on the operation.

SUMMARY

The present invention is therefore based on the objective of creating a method for actuating a switching valve of the type named above, by which an operation that precisely actuates the flow of fluid for such a switching valve is also enabled for switching processes in very rapid succession.

According to the invention, this objective is met by the characterizing features of claim 1, while advantageous refinements and constructions of the invention can be taken from the subordinate claims. Consequently, in at least one operating state of the fluid system, an intermediate excitation for damping an overshoot of the magnet armature shall be performed between two coil excitations displacing the armature group. Like in the coil excitation for displacing the armature group, in the case of the intermediate excitation, a force is generated that acts on the magnet armature but that is comparatively small and/or that acts for only a short time and that is directed against the mass-inertia forces and consequently the initial overshoot of the magnet armature and possibly of transmission components connected to this magnet armature and that, in the case of an armature spring, reinforces the effect of its force. Consequently, the overshoot can be damped both with respect to stroke and also duration, so that the free-flight phase of the magnet armature can be reduced at least to the duration of a largest possible permissible pause between two coil excitations/switching processes in very rapid succession.

Another advantage of the magnet armature damped in terms of oscillation by the intermediate excitation relates to the production costs of the switching valve. Because the contact surfaces of the armature group involved in resetting the overshooting magnet armature are still exposed to impact loading that is, in the case of the damping intermediate excitation, comparatively low, the cost-intensive expense for producing high-wear-resistant surfaces can be reduced accordingly.

In one refinement of the invention it is provided that the overshoot of the magnet armature takes place during a first time interval and the intermediate excitation is performed during a second time interval, wherein the first time interval lies completely within the second time interval. In other words, on one hand, the onset of the intermediate excitation should be performed at a time point before the beginning of the overshoot of the magnet armature when the armature group is still located in a state of uniform motion. On the other hand, the end of the intermediate excitation and consequently the beginning of the subsequent coil excitation for the new displacement of the armature group should not lie before the time point at which the active frictional connection between the magnet armature and the valve-closing body is re-established. In particular, in this way the contact velocity of the contact faces involved can be kept low and within mechanically permissible limits.

In addition, an especially low contact velocity could be achieved when the intermediate excitation is regulated in steps and has at least two average current intensities that differ from each other. Such an actuation is based on the consideration that the mass-inertia energy responsible for the overshoot of the magnet armature has already decayed in the phase of the initially higher current intensity, so that, for re-establishing the friction connection, only comparatively low forces are still required within the armature group. For this purpose, the force of the armature spring is possibly adequate, while the lower current intensity of the regulated intermediate excitation is used as pre-excitation of the solenoid for the subsequent coil excitation.

The method according to the invention is suitable especially for actuating a switching valve as part of an electrohydraulic timing gear for the stroke-variable gas-exchange-valve actuation of an internal combustion engine. While it should involve, in the case of the switching valve, a 2/2 port directional control valve, such a timing gear has at least the following features:
- a cam of a camshaft having at least one raised section and a master piston actuated by the cam;
- a slave piston applying a stroke force to at least one gas-exchange valve;
- a high-pressure chamber running between the master piston and the slave piston as well as a low-pressure chamber, wherein the switching valve is arranged between the high-pressure chamber and the low-pressure chamber.

In this case, the oscillation damping of the magnet armature due to the intermediate excitation enables a significant expansion of the usable thermodynamic potential of the known electrohydraulic timing gear with respect to the torque, output, and exhaust-gas emission behavior of the internal combustion engine. This is essentially based on the ability to tune the actuation of the gas-exchange valves to the widest range of requirements on the gas exchange in the characteristic map of the internal combustion engine. In actuality, the damped overshoot of the magnet armature allows two or more stroke profiles following each other in very short time intervals in the gas-exchange valve within the same cam revolution, because the flow of forces between the magnet armature and the valve-closing body is re-established at a significantly earlier time point and consequently a subsequent coil excitation for new displacement of the armature group in the closed position of the switching valve can be performed nearly immediately in connection with the preceding coil excitation.

In addition, the method shall be used in rotational-speed-dependent operating states of the timing gear. According to the gas-exchange strategy and the type of gas-exchange-valve actuation, it can involve both low and also high rotational-speed ranges in which stroke profiles following each other in very short time intervals in the gas-exchange valves are provided within the same cam revolution.

In this respect, it could involve, in a first operating state, a multiple stroke that comprises two or more individual strokes generated within the same cam raised section. Such a multiple stroke is advantageously applied to an intake valve, in order to improve the intake conditions of fresh gas into the relevant cylinder of the internal combustion engine.

Alternatively or optionally, the cam should have several raised sections, wherein, in a second operating state, the gas-exchange valve is actuated within the same cam revolution with a multiple stroke that comprises individual strokes generated within the individual raised sections. Such a construction and actuation of the timing gear is the basis, in particular, for a gas-exchange process with very high exhaust-gas recirculation rates. As becomes clear also in an embodiment of the invention explained below, in the case of a correspondingly actuated gas-exchange valve, it can involve either an exhaust valve or an intake valve or also both.

BRIEF DESCRIPTION OF THE DRAWINGS

Additional features of the invention emerge from the following description and from the drawings in which the method according to the invention is illustrated with reference to embodiments. If not mentioned otherwise, here features that are identical or that have the same function are provided with the same reference numbers. Shown are.

DETAILED DESCRIPTION OF THE PREFERRED EMBODIMENTS

Figure 7:
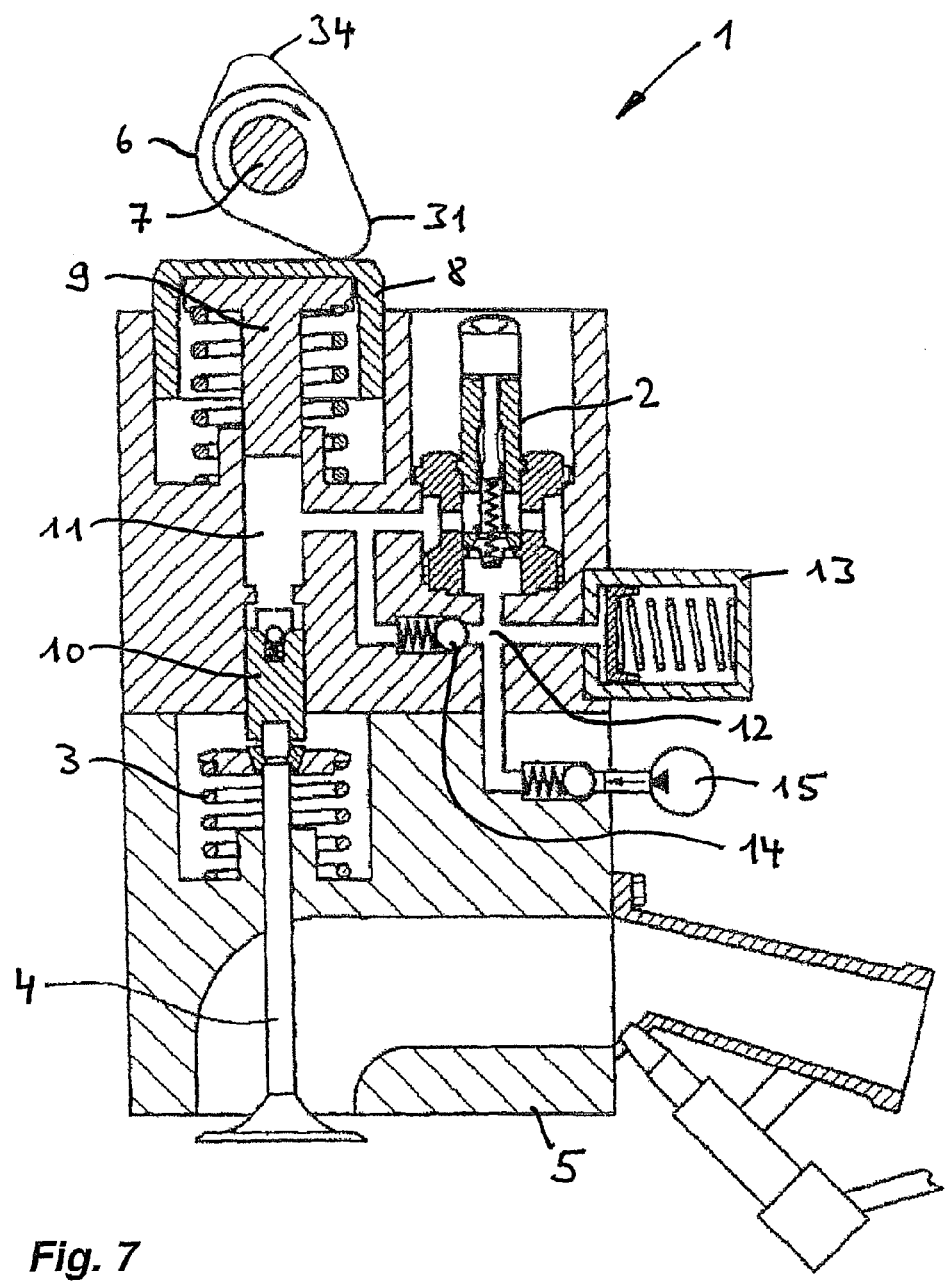
FIG. 7 a basic diagram of the electrohydraulic timing gear.
Figure 8:
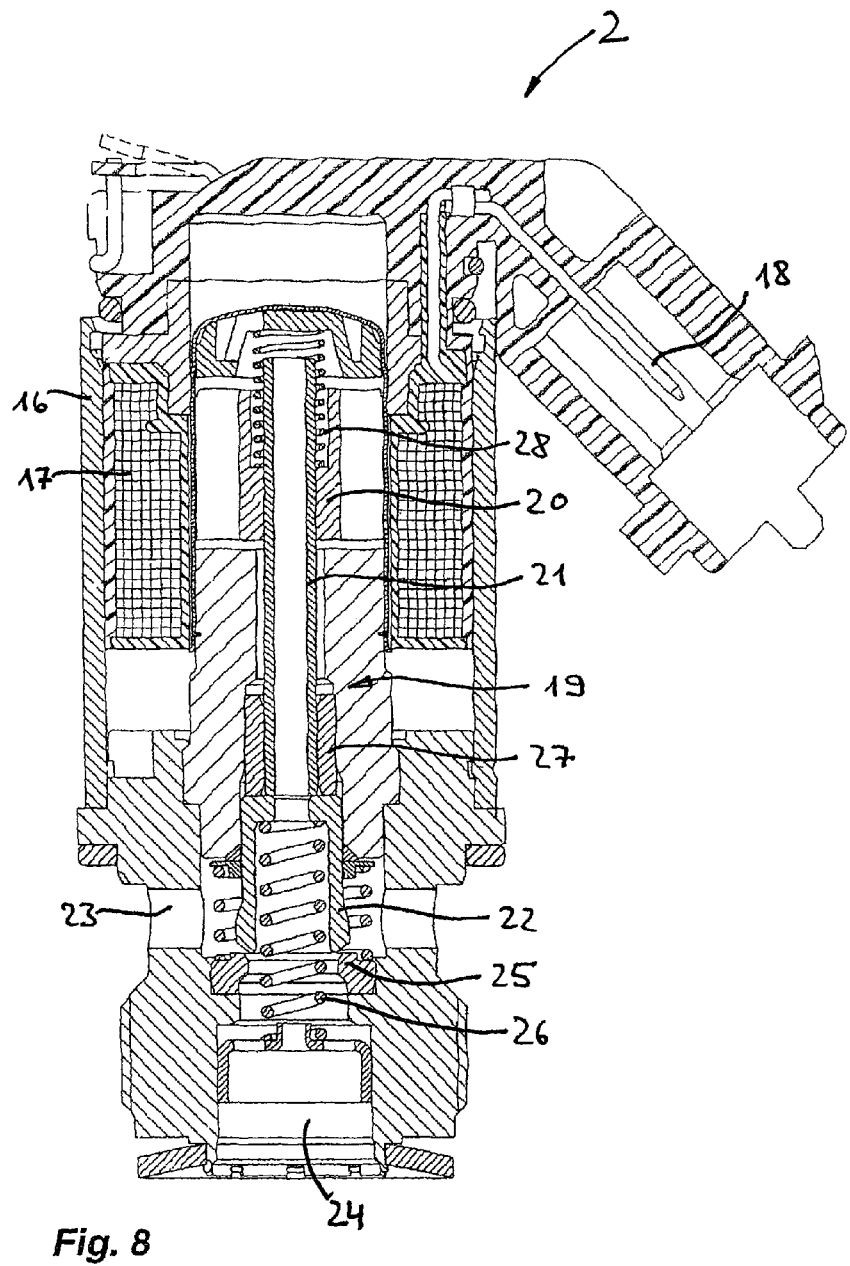
FIG. 8 an electromagnetic switching valve for performing the method according to the invention.

The starting point of the description is formed by a basic diagram shown in FIG. 7 of an electrohydraulic timing gear 1 as well as an electromagnetic switching valve 2 shown in FIG. 8 as part of such a timing gear 1, each of which is known as such in the state of the art and is merely referenced for better understanding of the method according to the invention for actuating the switching valve 2. The timing gear 1 is used for the stroke-variable actuation of a gas-exchange valve 4 receiving a force from a valve spring 3 in an internal combustion engine 5 and comprises, as essential components, a cam 6 of a camshaft 7, a master piston 9 actuated by the cam 6 here by a cup tappet 8, a slave piston 10 applying a stroke force to the gas-exchange valve 4, a high-pressure chamber 11 running between the master piston 9 and the slave piston 10, as well as a low-pressure chamber 12, wherein the switching valve 2 is arranged between the high-pressure chamber 11 and the low-pressure chamber 12.

The switching valve 2 is constructed as a 2/2 port directional control valve that is opened while non-energized and enables the flow of fluid between the high-pressure chamber 11 and the low-pressure chamber 12 in its non-energized, first switch position, while it blocks the flow of fluid between the high-pressure chamber 11 and the low-pressure chamber 12 in its energized, second switch position. The functioning of the known timing gear 1 can be combined to the extent that the hydraulic medium located in the high-pressure chamber 11 is used as a hydraulic link, wherein the stroke specified by the cam 6 is transferred to the gas-exchange valve 4 when the switching valve 2 is closed and is partially or completely shutdown in the low-pressure chamber 12 and here in a spring-loaded pressure accumulator 13 when the switching valve 2 is opened. A return flow of the hydraulic medium from the low-pressure chamber 12 into the high-pressure chamber 11 is realized via a bypass non-return valve 14. Furthermore, the timing gear 1 is connected to a hydraulic medium supply 15 of the internal combustion engine 5 for compensating for leakage.

The structural construction of the switching valve 2 emerges in more detail from FIG. 8. The switching valve 2 has a valve housing 16 with a solenoid 17 and an electrical plug connection 18 connected to this solenoid. An armature group 19 receiving a force from the energized solenoid 17 is formed of a magnet armature 20 supported so that it can move longitudinally within the solenoid 17, an armature tappet 21 mounted on this magnet armature, as well as a valve-closing body 22 on which the armature tappet 21 contacts merely on the end face for transferring compressive forces. Consequently, the armature tappet 21 and the valve-closing body 22 are connected to each other with a frictional connection that is free from tensile force.

As shown, the switching valve 2 is opened in the non-energized state, so that, in this switched state, a flow of hydraulic medium can be formed between a high-pressure-chamber-side connection 23 and a low-pressure-chamber-side connection 24 through an annular gap between the valve-closing body 22 and a housing-fixed sealing seat 25. For sufficiently high coil excitation, the armature group 19 is displaced into the second switch position in which the valve-closing body 22 contacts the sealing seat 25 and the flow of hydraulic medium between the high-pressure-chamber-side connection 23 and the low-pressure-chamber-side connection 24 is blocked. After this coil excitation is switched off, the force of an opener spring 26 causes the common return displacement of the valve-closing body 22, the armature tappet 21, and the magnet armature 20 up to the time point at which the valve-closing body 22 contacts a housing-fixed bearing bushing 27 for the armature tappet 21. Simultaneously, the mass inertia of the armature tappet 21 and the magnet armature 20 leads to a separation of the armature tappet 21 from the valve-closing body 22, so that the armature tappet 21 and the magnet armature 20 overshoot for the duration of a subsequent free-flight phase against the force of an armature spring 28.

As will become clear with reference to figures described below, through a so-called intermediate excitation between two successive coil excitations displacing the armature group 19 in the closing direction, not only the spatial and time extent of the overshoot, but also the mechanical impulse when the armature tappet 21 re-engages the valve-closing body 22, can be damped effectively. In the diagram shown in FIG. 1, the time profile of the coil current designated with I and the movement of the armature group 19 between the first switch position designated with "Open", i.e., the opened position, and the second switch position designated with "Closed", i.e., the closed position, in the switching valve 2 are recorded. The starting point of the view is the closed switch position in which, at a time point t1, the coil excitation is switched off and the armature group 19 is moved in the direction of the opened switch position. The free-flight phase 29 of the armature tappet 21 and the magnet armature 20 begins at a time point t2 at which the valve-closing body 22 contacts the bearing bushing 27 and the armature tappet 21 rises from the valve-closing body 22 due to mass-inertia forces. The free-flight phase 29 ends at a time point t4 at which the armature tappet 21 is set back on the valve-closing body 22 and has the duration designated with $\Delta t_S$. For reducing the overshoot stroke and the duration $\Delta t_S$, the solenoid 17 is energized at an intermediate time point t3 lying before the time point t2, so that the magnetic force established in this way counteracts the mass-inertia forces and essentially cancels these out. The intermediate excitation designated with 30 ends at a time point t5 at which the solenoid 17 is moved into the closed switch position with a subsequent coil excitation for the new displacement of the armature group 19 and the valve-closing body 22.

It is clearly visible that the time interval designated with $\Delta t_I$ of the intermediate excitation 30 is longer than the time interval $\Delta t_S$ of the free-flight phase 29 and that the time interval $\Delta t_S$ lies completely within the time interval $\Delta t_I$. For completeness, it should be noted that in the limiting case, equally long time intervals $\Delta t_I$ and $\Delta t_S$ could also be provided, wherein the time points t2 and t3 or t4 and t5 then coincide.

The characteristic of the intermediate excitation 30 leads, on one hand, to a timely buildup of force counteracting the mass-inertia forces of the armature tappet 21 and the magnet armature 20, because the buildup of magnetic force happens at an earlier time point than the beginning of the free-flight phase 29. On the other hand, in connection with the comparatively small average current intensity of the intermediate excitation 30, the time point t5 lying after the time point t4 prevents an excess counter force also reinforced by the armature spring 28 on the magnet armature 20, so that the setting of the armature tappet 21 back on the valve-closing body 22 happens with a mechanically acceptable contact velocity.

Figure 1:
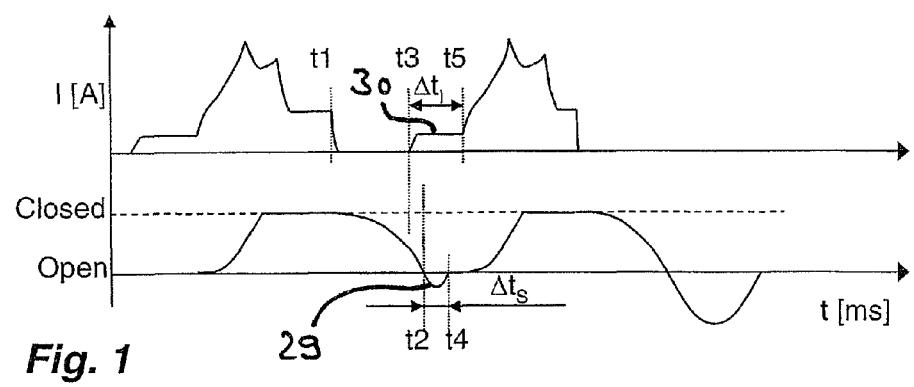
FIG. 1 in diagramatic form, the time excitation and stroke profile of an electromagnetic switching valve as part of an electrohydraulic timing gear.
Figure 2:
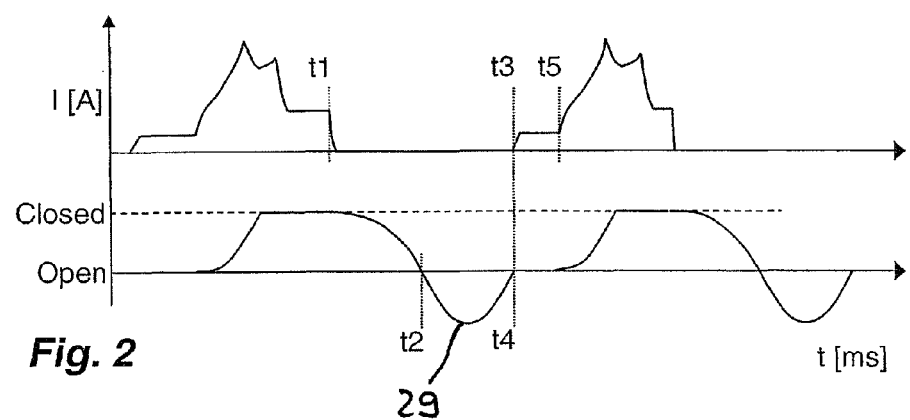
FIG. 2 a reference diagram according to FIG. 1 without intermediate excitation.
Figure 3:
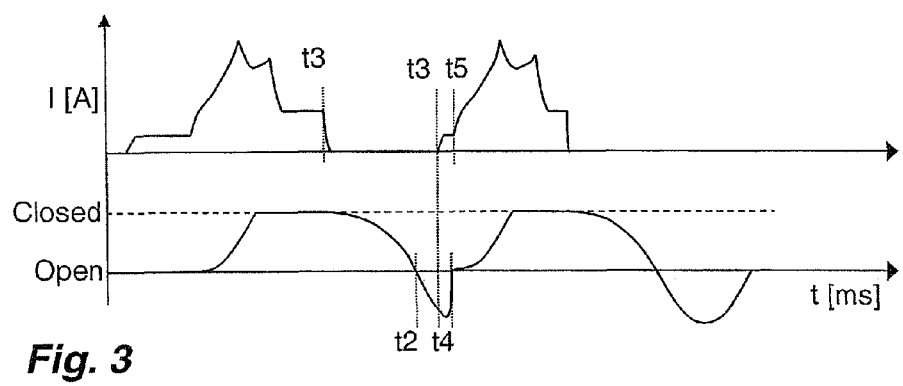
FIG. 3 a reference diagram according to FIG. 1 without intermediate excitation and less favorable time coil excitation.

The advantages of the intermediate excitation 30 according to the invention are given through a comparison with corresponding reference diagrams shown in FIGS. 2 and 3. FIG. 2 shows the time displacement of the armature group 19 without intermediate excitation. It is clearly visible that both the stroke height and also the duration of the free-flight phase 29 between the time points t2 and t4 are significantly larger than in FIG. 1. Accordingly, a new and defined displacement of the valve-closing body 22 into the closed switch position can happen only with a comparatively late, successive coil excitation including the pre-excitation of the solenoid 17 between the time points t3 and t5.

As emerges from FIG. 3, a pre-displacement of the time point t3 between the time points t2 and t4 would be counterproductive even for shortening the pre-excitation duration up to the time point t5, because then the magnetic force counteracting the mass-inertia forces of the armature tappet 21 and the magnet armature 20 would be established at too late a time and would lead, in connection with the force of the armature spring 28, to a mechanically impermissibly high contact velocity of the armature tappet 21 on the valve-closing body 22 at the time point t4.

Figure 4:
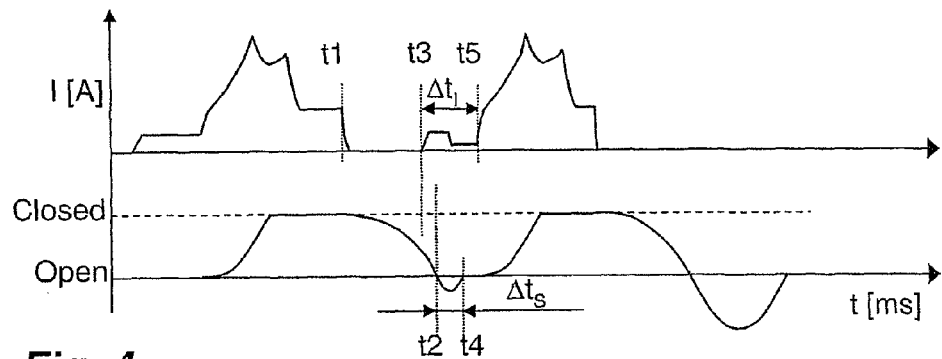
FIG. 4 a diagram according to FIG. 1 with intermediate excitation regulated in steps.

Building on the method according to the invention with intermediate excitation 30 according to FIG. 1, this contact velocity could also be reduced such that the intermediate excitation 30 is regulated in steps within the time interval $\Delta t_I$, so that the magnetic force also acting toward the armature spring 28 still plays only a subordinate role in resetting the armature tappet 21 at the time point t4. These conditions are shown in FIG. 4 with two average current intensities differing from each other.

Figure 5:
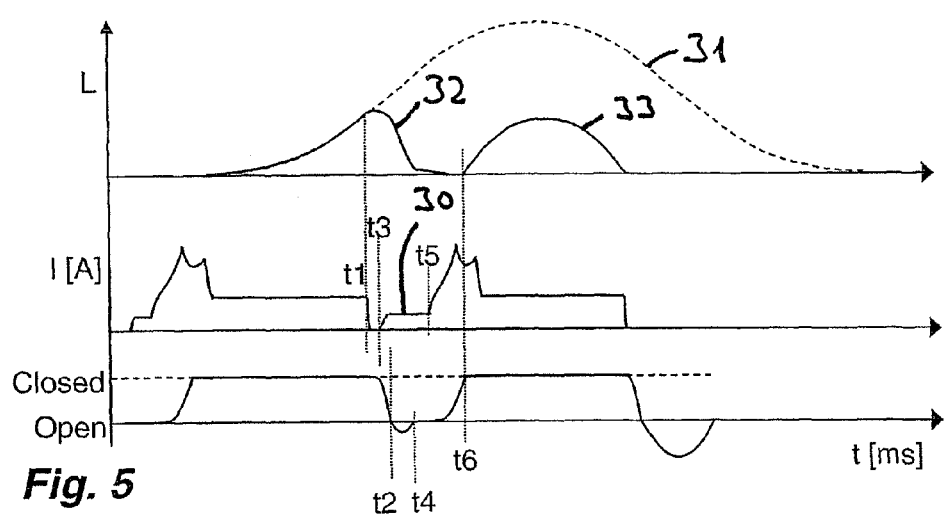
FIG. 5 a diagram according to FIG. 1, expanded by the multiple stroke of an intake valve of the electrohydraulic timing gear.

The diagram shown in FIG. 5 also contains a stroke profile of the gas-exchange valve 4, with this profile being designated with L. In addition to the stroke profile of the gas-exchange valve 4 shown with solid lines, the raised section 31 of the cam 6 shown with dashed lines is also visible. Considered from the viewpoint of leakage losses from the high-pressure chamber 11, the raised section 31 and the stroke profile of the gas-exchange valve 4 would be identical if the switching valve 2 were closed during the entire duration of the raised section 31. Analogous to FIG. 1, however, the coil excitation is switched off in the course of the effective raised section 31 at the time point t1, so that a first individual stroke 32 of the gas-exchange valve 4 generated up until then is interrupted and the gas-exchange valve 4 closes. As already explained, the intermediate excitation 30 according to the invention allows the generation of a second individual stroke 33 of the gas-exchange valve 4 within a very short time and here immediately following, with this stroke beginning in the new, closed switch position of the valve-closing body 22 at a time point t6. A multiple stroke generated in this way in the gas-exchange valve 4, with this multiple stroke being combined from the individual strokes 32 and 33 in rapid succession within the same raised section 31 of the cam 6, is suitable with respect to optimizing the gas-exchange process of the internal combustion engine 5 primarily for a gas-exchange valve 4 constructed as an intake valve.

Figure 6:
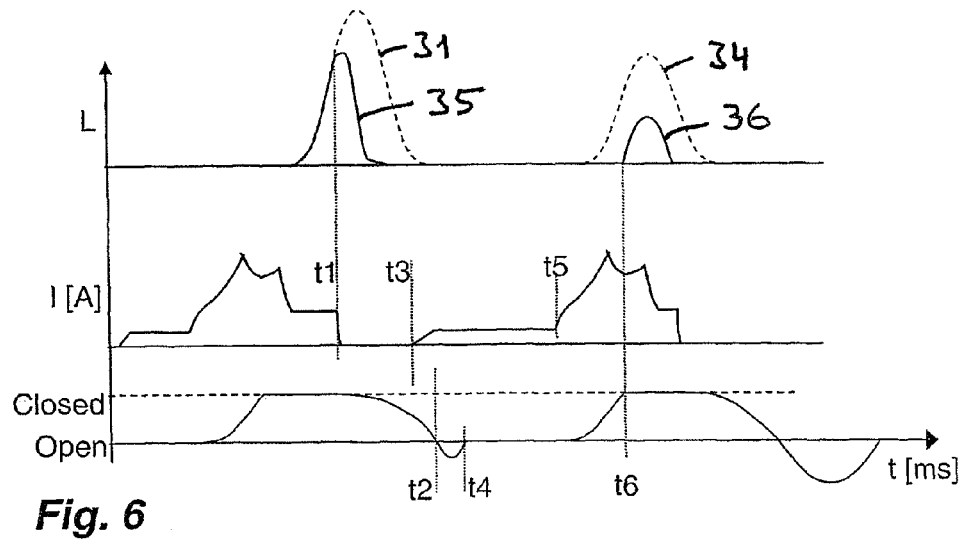
FIG. 6 a diagram according to FIG. 1, expanded by an individual stroke of an intake or exhaust valve of the electrohydraulic timing gear.

In contrast, a multiple stroke of the gas-exchange valve 4 shown in FIG. 6—likewise within the same revolution of the cam 6—is equally suitable for intake and exhaust valves and each leads to a gas exchange with high internal exhaust-gas recirculation rates. The solid lines correspond, in turn, to the stroke transferred to the gas-exchange valve 4, while the dashed lines correspond to the raised sections 31 or 34 of the cam 6 and are shown here for a cam 6 actuating an exhaust valve. While the individual stroke 35 corresponds to the conventional exhaust stroke during the expansion phase of the internal combustion engine 5, the raised section 34 is used for generating an individual stroke 36 that is activated during the intake cycle of the internal combustion engine 5. Consequently, in this operating state, during the intake cycle, not only fresh gas is drawn into the relevant cylinder of the internal combustion engine 5 from the intake system, but also exhaust gas from the exhaust-gas system. The dosing of the exhaust gas is performed through suitable timing settings of the individual stroke 36 that begins, in this case, at the time point t6 after the kinematically specified opening time point of the raised section 34 and is consequently smaller and shorter than the raised section 34.

For the case that the internal exhaust-gas recirculation is to be performed by an individual stroke 36 on an intake valve, either the rotational direction of the camshaft 7 illustrated in FIG. 7 would be reversed or the raised sections 31 and 34 would be adjusted. Accordingly, the exhaust gas would be pushed out into the intake channel during the expansion phase of the internal combustion engine 5 and the then opened intake valve and would be drawn back into the relevant cylinder of the internal combustion engine 5 during the intake phase.

LIST OF REFERENCE SYMBOLS

1 Electrohydraulic timing gear
2 Switching valve
3 Valve spring
4 Gas-exchange valve
5 Internal combustion engine
6 Cam
7 Camshaft
8 Cup tappet
9 Master piston
10 Slave piston
11 High-pressure chamber
12 Low-pressure chamber
13 Pressure accumulator
14 Bypass non-return valve
15 Hydraulic medium supply
16 Valve housing
17 Solenoid
18 Electrical plug connection
19 Armature group
20 Magnet armature
21 Armature tappet
22 Valve-closing body
23 High-pressure-chamber-side connection
24 Low-pressure-chamber-side connection
25 Sealing seat
26 Opener spring
27 Bearing bushing
28 Armature spring
29 Free-flight phase
30 Intermediate excitation
31 Raised section
32 First individual stroke
33 Second individual stroke
34 Raised section
35 Individual stroke
36 Individual stroke
t Time point
Δt Time interval
I Coil current
L Stroke profile of the gas-exchange valve

The invention claimed is:

1. Method for actuating an electromagnetic switching valve that is part of a fluid system having different operating states, comprising providing the electromagnetic switching valve that has a solenoid as well as an armature group that can be moved between a first switch position enabling a flow of fluid and a second switch position blocking the flow of fluid, wherein the armature group has a valve-closing body and an armature tappet with a magnet armature that connects to the valve-closing body with a tensile force-free frictional connection, and performing intermediate excitation for damping an overshoot of the magnet armature in at least one operating state of the fluid system between two coil excitations displacing the armature group, and the overshoot is for a duration of a free-flight phase of the armature tappet with the magnet armature against the force of an armature spring.

2. Method according to claim 1, wherein the overshoot of the magnet armature is realized during a first time interval ($\Delta t_S$) and the intermediate excitation is performed during a second time interval ($\Delta t_I$), wherein the first time interval ($\Delta t_S$) lies completely within the second time interval ($\Delta t_I$).

3. Method according to claim 1, wherein the intermediate excitation is regulated in steps and has at least two average current intensities differing from each other.

4. Method for actuating an electromagnetic switching valve that is part of a fluid system having different operating states, comprising providing the electromagnetic switching valve that has a solenoid as well as an armature group that can be moved between a first switch position enabling a flow of fluid and a second switch position blocking the flow of fluid, wherein the armature group has a valve-closing body and a magnet armature that connects to the valve-closing body with a tensile force-free frictional connection, and performing intermediate excitation for damping an overshoot of the magnet armature in at least one operating state of the fluid system between two coil excitations displacing the armature group, wherein the switching valve comprises a 2/2 port directional control valve that is not energized in the first switch position and the fluid system is an electrohydraulic timing gear for a stroke-variable gas-exchange valve actuation of an internal combustion engine, and the timing gear has at least the following features:
   a cam of a camshaft having at least one raised section and a master piston actuated by the cam;
   a slave piston applying a stroke force on at least one gas-exchange valve;
   a high-pressure chamber running between the master piston and the slave piston as well as a low-pressure chamber, wherein the switching valve is arranged between the high-pressure chamber and the low-pressure chamber.

5. Method according to claim 4, wherein the operating states are dependent on a rotational speed of the internal combustion engine.

6. Method according to claim 4, wherein in a first operating state of the timing gear, the gas-exchange valve receives a multiple stroke force comprising individual strokes generated within a same raised section within a same revolution of the cam.

7. Method according to claim 6, wherein the gas-exchange valve is an intake valve.

8. Method according to claim 4, wherein the cam has several raised sections wherein, in a second operating state of the timing gear, the gas-exchange valve receives a multiple stroke force comprising individual strokes generated within raised sections within a same revolution of the cam.

9. Method according to claim 8, wherein the gas-exchange valve is an exhaust valve.

10. Method according to claim 8, wherein the gas-exchange valve is an intake valve.

* * * * *